April 7, 1925.  1,532,429
R. L. MILLER
FIXTURE FOR POULTRY HOUSES AND COOPS
Original Filed May 3, 1923

R.L.Miller
INVENTOR.
BY John. M. Spellman
ATTORNEY

Patented Apr. 7, 1925.

1,532,429

UNITED STATES PATENT OFFICE.

ROBERT L. MILLER, OF DALLAS, TEXAS.

FIXTURE FOR POULTRY HOUSES AND COOPS.

Application filed May 3, 1923, Serial No. 636,417. Renewed February 12, 1925.

*To all whom it may concern:*

Be it known that I, ROBERT L. MILLER, a citizen of the United States, residing at Dallas, in the county of Dallas and State of Texas, have invented certain new and useful Improvements in Fixtures for Poultry Houses and Coops, of which the following is a specification.

This invention relates to fixtures for poultry houses and coops, and refers to fixtures so constructed as to afford a containing means for oil and creosote in varying proportions in close proximity to the chickens or other fowls when same are nesting, roosting or on the floor of the coop.

An object of the invention is to provide fixtures that will cause the air near the fowls to be permeated with the creosote in sufficient density to kill lice or other vermin usually found in such places.

Another object of the invention is to provide a means whereby the creosote may be efficacious over a long period of time without the mixture being frequently changed or evaporating.

Other objects and features will be set forth in the following description, taken in connection with the drawings attached hereto, as follows.

Figure 1:
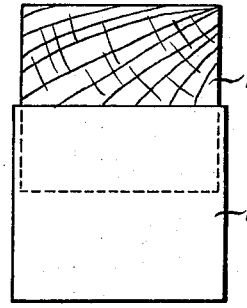
Figure 1 shows an end view of the creosote container, and the strip fastened therein.
Figure 2:
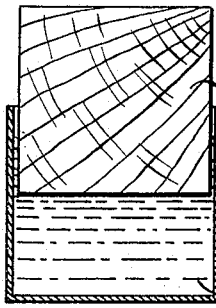
Figure 2 shows a cross-section of Figure 1 and of Figure 3.
Figure 3:
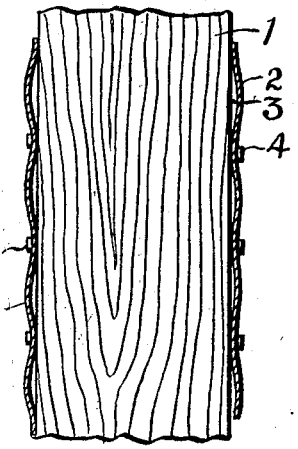
Figure 3 shows a top view of part of the creosote container with the strip therein.

In Figures 1, 2 and 3 the wooden strip 1 is shown fastened to trough 2 of preferably galvanized iron, the sides of which have vertically extending corrugations to afford openings through which the creosote vapors from creosote 3 may arise. The trough 2 is attached to the strip 1 by suitable nails, screws, bolts or the like 4.

Figure 4:
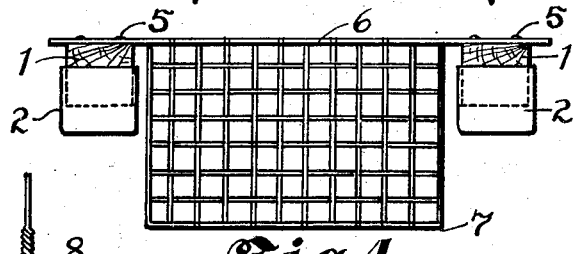
Figure 4 represents the device in attachment to a wire mesh nest.

In Figure 4, the means shown in the three preceding figures are supporting nest 7, from supporting metal strips 6 fastened on the top of wooden strips 1—1 by means 5—5.

Figure 5:
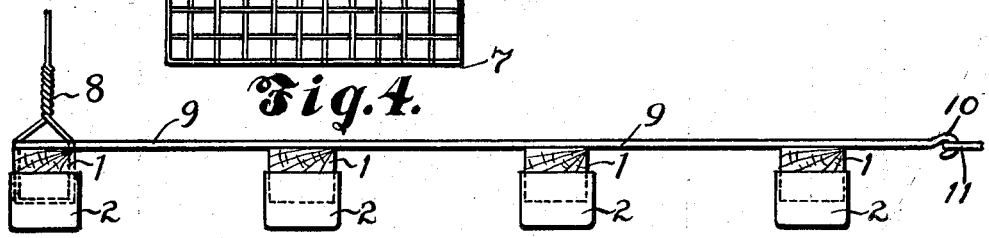
Figure 5 shows the device in attachment for roosting purposes.

In Figure 5, the means shown in the first three figures are illustrated when used as roosts for the poultry. The frame 9 connecting and spacing the roosts, is fastened to the walls of the poultry house by hook and eye 10 and 11 or other suitable means and is supported from the ceiling of the poultry house by suitable rods or wires 8 or other suitable suspension means.

It will be understood that the creosote pans or containers as shown may be arranged at suitable points around the interior of the poultry house to render a thorough disinfection thereof.

By use of this means lice and vermin cannot survive for any extended period, as the vapors permeate the feathers of the poultry and reach all points.

By mixing the creosote with oil instead of other liquids the containers will not rust, evaporation is practically eliminated and frequent changing of the mixture is unnecessary.

In view of this, and the simple and inexpensive construction,

What is claimed is:

1. In a fixture for poultry houses and coops, a support, and a chemical-receiving container having a bottom disposed below the support, ends, and vertically corrugated sides having convex parts arranged in juxtaposition to opposite sides of the support and concave parts spaced from the said opposite sides of the support to afford passages for the fumes of the chemical.

2. In a fixture for poultry houses and coops, a support, and a chemical-receiving container having a bottom disposed below the support ends, and sides which have inwardly extending parts that abut and are affixed to opposite sides of the support and having outwardly extending parts spaced from the said opposite sides of the support to afford passages for the fumes of the chemical.

In testimony whereof I have signed my name to this specification.

ROBERT L. MILLER.